Nov. 25, 1958    F. H. KAYLER ET AL    2,861,818
FIFTH WHEEL COUPLING MECHANISM
Filed Feb. 1, 1955    5 Sheets-Sheet 1

Witness:

INVENTORS.
Frank H. Kayler
Frederick E. Kulieke
Elmer J. Greenawalt
By Walter L. Schlegel, Jr. Atty.

Nov. 25, 1958 F. H. KAYLER ET AL 2,861,818
FIFTH WHEEL COUPLING MECHANISM
Filed Feb. 1, 1955 5 Sheets-Sheet 2
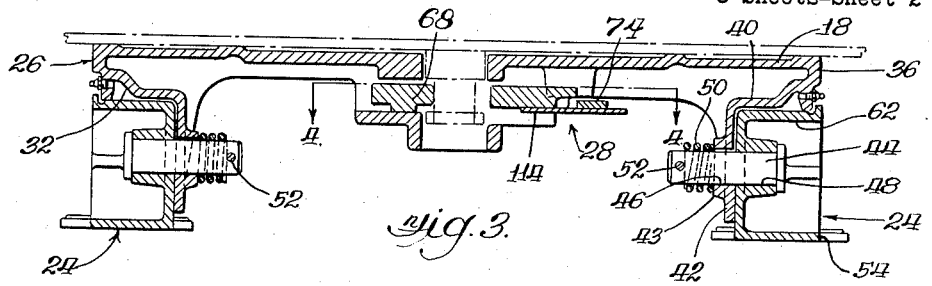
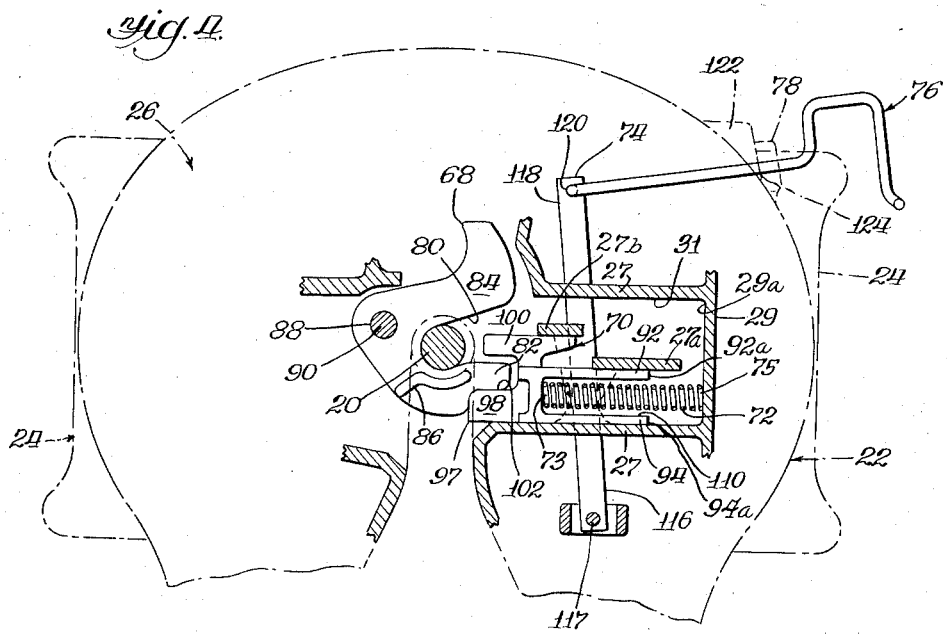
INVENTORS.
Frank H. Kayler
Frederick C. Kulieke
Elmer J. Greenawalt
By Walter L. Schlegel, Jr. Atty

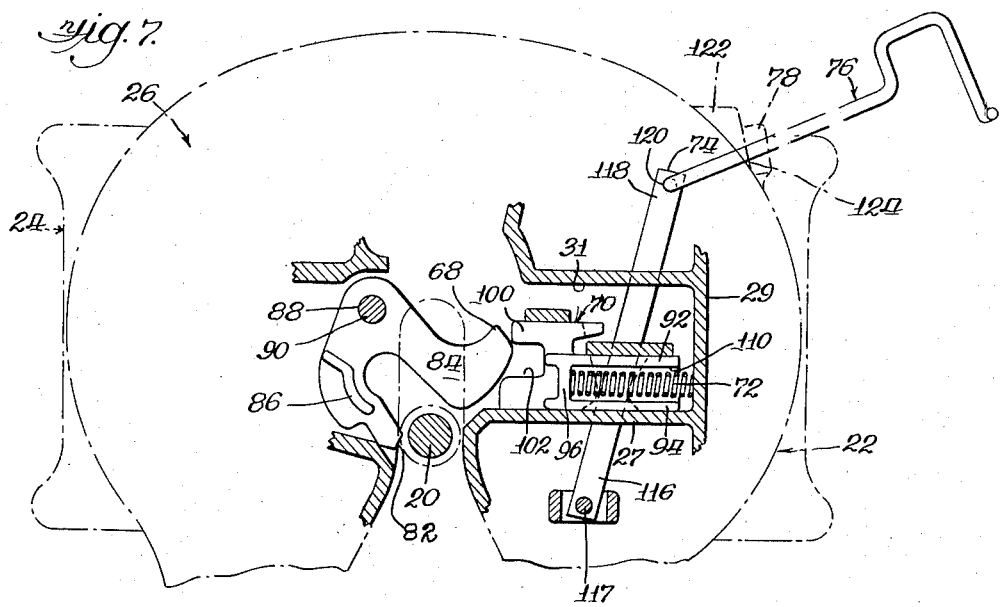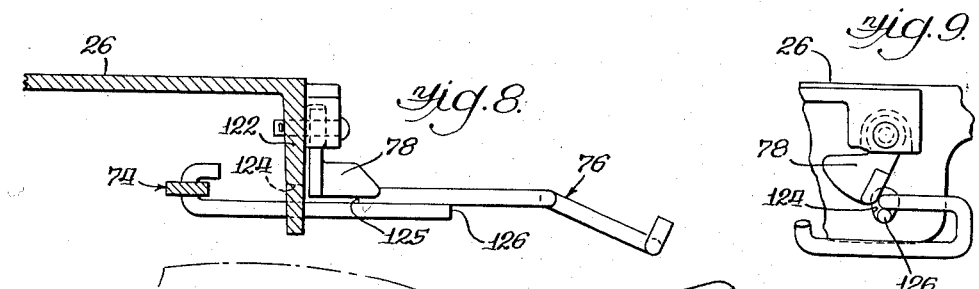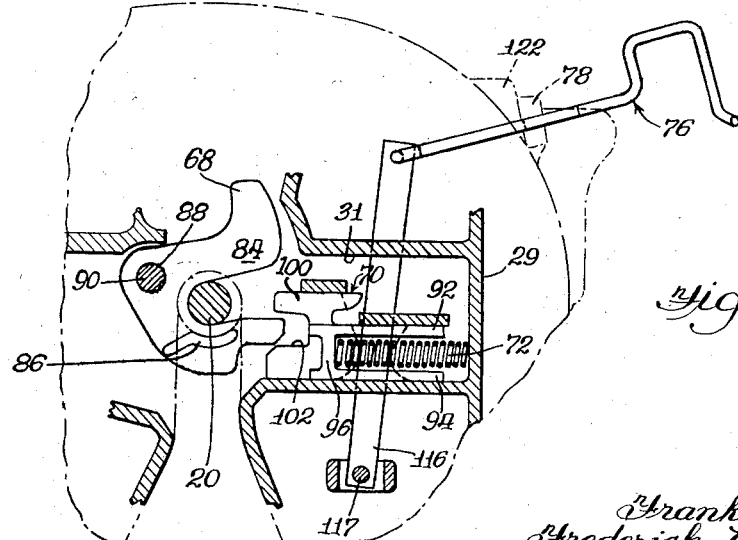

Nov. 25, 1958 — F. H. KAYLER ET AL — 2,861,818
FIFTH WHEEL COUPLING MECHANISM
Filed Feb. 1, 1955 — 5 Sheets-Sheet 4
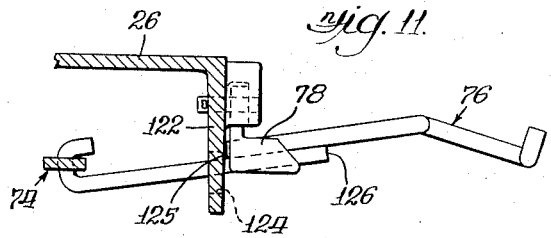
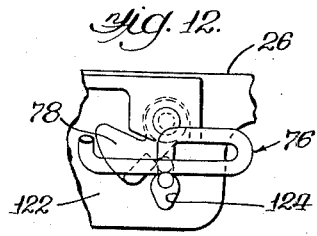
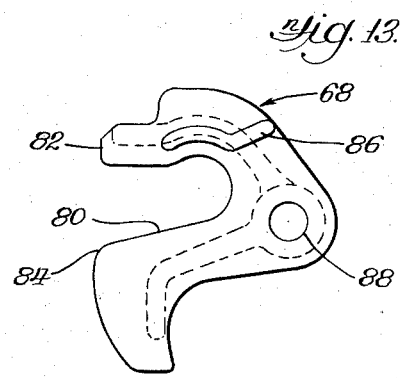
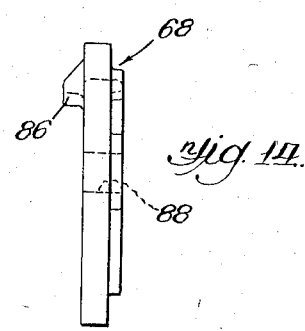
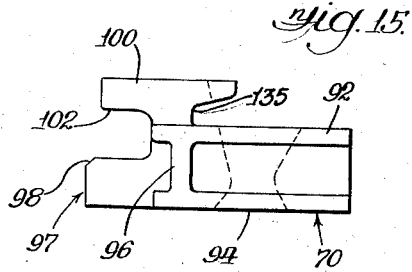
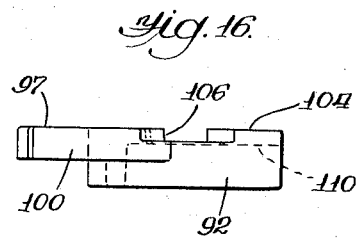
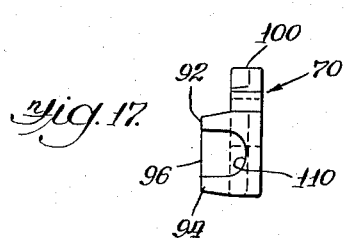
INVENTORS.
Frank H. Kayler
Frederick E. Kulieke
Elmer J. Greenawalt
By: Walter L. Schlegel, Jr. Atty.

Nov. 25, 1958  F. H. KAYLER ET AL  2,861,818
FIFTH WHEEL COUPLING MECHANISM
Filed Feb. 1, 1955  5 Sheets-Sheet 5
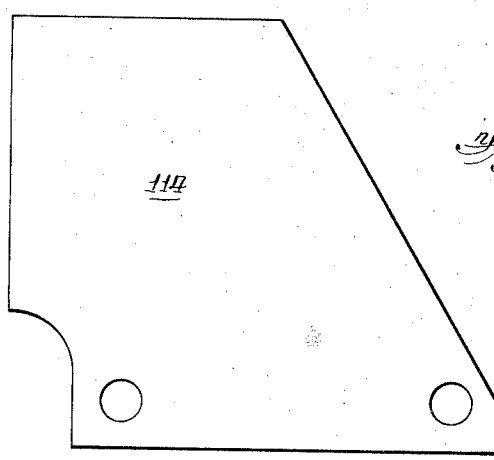
Fig. 18.
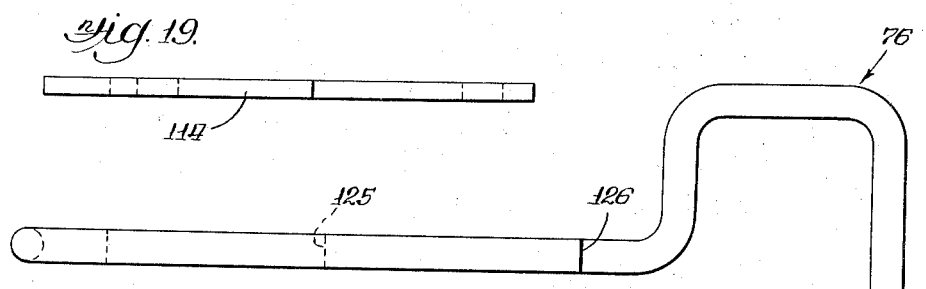
Fig. 19.
Fig. 20.
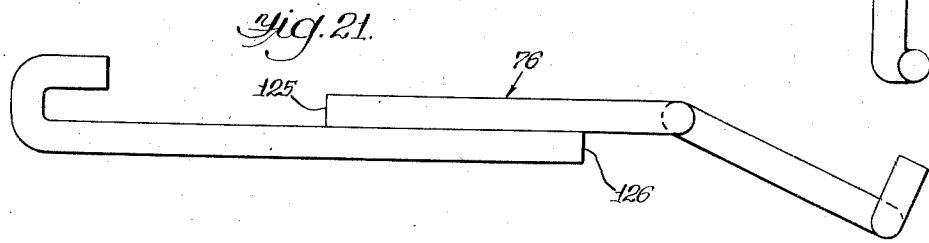
Fig. 21.
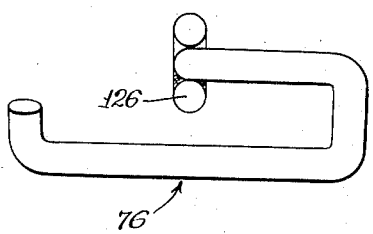
Fig. 22.
Witness:
Richard W...
INVENTORS.
Frank H. Kayler
Frederick C. Kulieke
Elmer J. Greenawalt
By Walter L. Schlegel, Jr. Atty _United States Patent Office_

2,861,818
Patented Nov. 25, 1958

2,861,818

FIFTH WHEEL COUPLING MECHANISM

Frank H. Kayler, Frederick C. Kulieke, and Elmer J. Greenawalt, Alliance, Ohio, assignors to American Steel Foundries, Chicago, Ill., a corporation of New Jersey Application February 1, 1955, Serial No. 485,394

20 Claims. (Cl. 280—434)

This invention relates to coupling arrangements for tractor trailer devices and more particularly to those coupling arrangements commonly known as fifth wheels.

Many of the fifth wheel coupling arrangements available today are complicated in structure requiring a large number of specially designed parts and also relying on the use of numerous small springs for their operation. It is, therefore, a primary object of this invention to provide a simple coupling arrangement having a minimum number of parts, including a single spring.

Another object of the invention is the provision of a fifth wheel coupling arrangement wherein the parts are all simple in design and readily adaptable to standard manufacturing processes such as casting or forging, so as to be economical to produce.

Another object of the invention is the provision of an arrangement whereby the coupling mechanism may be maintained in a lock-set position during the coupling operation without the need of having the lock handle held manually.

Another object of the invention is the provision of an arrangement whereby the coupling arrangement has an anti-creep mechanism to prevent accidental uncoupling.

A more specific object of the invention is the provision of an arrangement wherein a generally flat rotatable jaw, engageable with a king pin, is retained in coupled position by a slidably engaging lock.

These and other objects of the invention will become apparent from an examination of the description and drawings, wherein:

Figure 3 is a fragmentary sectional view taken along the line 3—3 of Figure 1;

Figure 4 is a fragmentary sectional view taken along the line 4—4 of Figure 3, illustrating the jaw and lock in locked coupled position;

Figure 5 is a fragmentary sectional view taken along the line 5—5 of Figure 1, illustrating the lock handle which is in the same position as shown in Figure 4;

Figure 6 is a fragmentary side elevational view of the structure shown in Figure 5;

Figures 7, 8 and 9 are similar to Figures 4, 5 and 6 but show the coupling mechanism in the uncoupled position;

Figures 10, 11 and 12 are also similar to Figures 4, 5 and 6 but show the coupling mechanism in the lock-set position;

Figures 13 and 14 are top and side detail views of the jaw;

Figures 15, 16 and 17 are top, front and side detail views of the lock;

Figures 18 and 19 are top and end detail views of the lock cover;

Figures 20, 21 and 22 are top, front and side detail views of the lock operating handle.

Figures 1, 2:
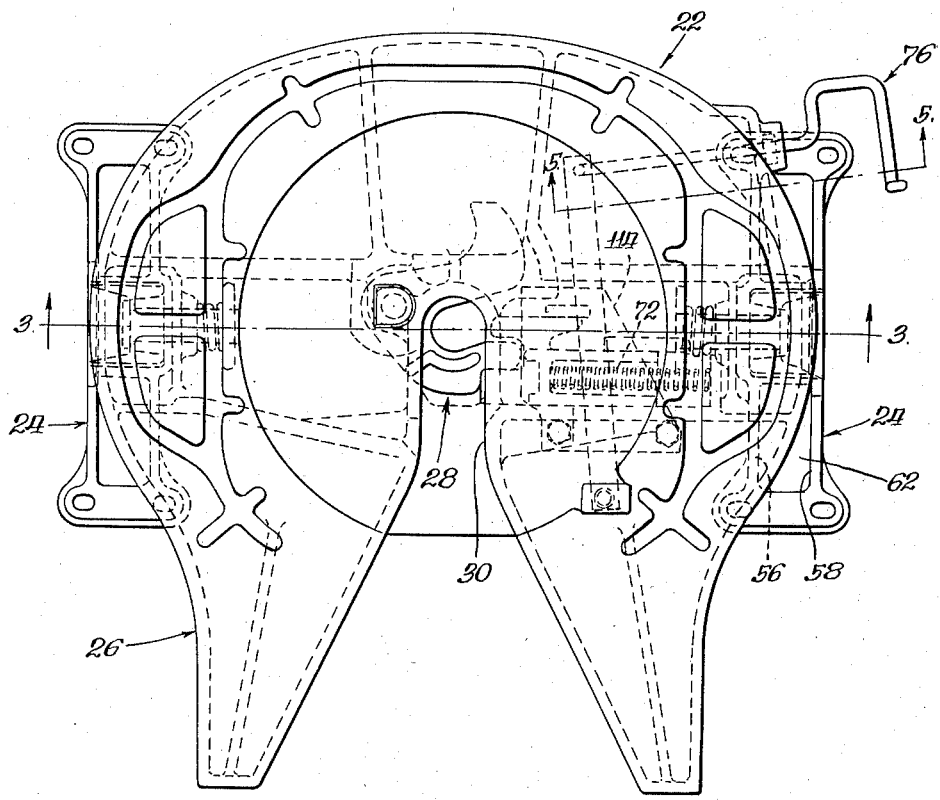
Figure 1 is a top plan view of a fifth wheel assembly employing the novel coupling device.
Figure 2 is a side elevational view of the structure shown in Figure 1.

It will be noted that some of the parts have been omitted from certain of the views where they are more clearly shown in other views.

To describe the invention in detail, it will be understood that in a conventional tractor-trailer coupling arrangement the basic units comprise a vertical king pin or post rigidly secured to, and depending from, the underside of the forward portion of the trailer, and the fifth wheel coupling mechanism movably mounted on the frame of the tractor. The purpose of the fifth wheel mechanism being to receive and retain the king pin of the trailer in order to couple the vehicles together. Inasmuch as this invention relates primarily to the coupling arrangement of the fifth wheel assembly, the king pin of the trailer is illustrated only in a few figures where it is necessary to show its relation to the jaw and lock of the coupling mechanism. In those cases it is designated 20.

Referring now to Figures 1–3 of the drawings, it will be noted that the fifth wheel assembly designated generally at 22 comprises mounting brackets 24, wheel plate 26 and coupling mechanism 28 in addition to other parts hereinafter described.

The fifth wheel plate 26 is bifurcated, forming slot 30, in which is received a king pin 20 of the trailer to effect a coupling between the vehicles.

On each side of the tractor frame (not shown) the fifth wheel assembly 22 may be pivotally supported from the mounting brackets 24, which are secured to the frame in any conventional manner. Each pivotal connection for the fifth wheel plate 26 includes a downwardly projecting saddle bracket 32 mounted at each side of the wheel plate. The saddle brackets are of skeletal form and have spaced transverse vertical webs 34 merging with the longitudinal vertical webs 36 integrally formed with the plate 26. Integrally formed with the lower edge of the web 36 and extending between the transverse webs 34 and merging at the lower edges thereof is the arcuate bottom wall 40 having a depending inner flange 42. The flange 42 may be formed with a relatively thick center section 43, thus affording a convenient bearing hub.

The saddle brackets 32 of the plate 26 are each pivotally secured to the respective mounting bracket 24, hereinafter described, by means of pivotal pin 44 which is received in openings 46 and 48 of the saddle and mounting brackets, respectively. A coil spring 50 may be placed on pin 44 so as to surround it in abuttable engagement with section 43 so as to prevent rattling and to maintain the mounting and saddle brackets in firm engagement with each other. Retaining means 52 such as a cotter may be employed at the end of each pin 44. Each mounting bracket comprises a relatively long rectangular base plate 54 having spaced upstanding longitudinal ribs 56 and 58 tapered upwardly to merge with the central portion 60. The central portion 60 includes a substantially semicircular arcuate wall 62 extending between the flanges 56 and 58, and merging at the opposite ends thereof with the spaced upstanding transverse web 64 formed on the base plate 54 and having an outer substantially convex semicylindrical surface 66 adjacent the bottom surface of the arcuate wall 40 of the saddle bracket 32.

Conventional lubricating means may be provided for the related brackets.

It is to be noted that the fifth wheel assembly may be mounted to the truck frame in any conventional manner known to those skilled in the art.

The coupling mechanism 28 is positioned on the underside of the wheel plate 26 and comprises a coupling jaw 68, a lock 70, lock spring 72, a lock bar 74, and a lock handle 76.

The jaw 68, as best seen in Figures 4 and 13, is a flat element being somewhat U-shaped so as to have a pin receiving opening 80 centrally thereof, defined by locking arm 82 and tail 84. Adjacent arm 82 has an upwardly extending bearing lug 86. Also adjacent opening 80 of the jaw is another opening 88 in which is received pivot pin 90 which serves to pivotally connect the jaw to the underside of the wheel plate, thus permitting the jaw to rotate in a plane parallel to the plane in which the plate is disposed. The jaw is positioned adjacent the opening 30 of the plate so that when it is pivoted into the coupled position the arm 82 and the tail 84 of the jaw extend across slot 30 of the plate, so that the opening 80 of the jaw is disposed at approximately 90° to slot 30 of the plate.

Adjacent the slot 30 of the plate on the side opposite the jaw, the lock 70 is positioned so as to be slidably engageable with the jaw.

Depending from the underside of plate 26 are spaced parallel walls 27 connected at one end by depending wall 29 so as to define therebetween a channel 31 open at the end adjacent slot 30. In the channel 31 between the walls 27 are disposed another pair of walls 27a and 27b, respectively, which depend from the plate and form additional guide or abutment surfaces for the lock 70.

Lock 70 is positioned in channel 31 and maintained in the channel by means of lock cover 114, which may be bolted to the plate 26.

The lock 70 as seen in Figures 15–17 is a generally rectangular element comprising horizontally spaced longitudinally extending plates 92 and 94 parallel to walls 27, connected by a transverse web 96 parallel to wall 29 and defining a spring cavity 110 therebetween. Integral with and positioned on the bottom of the spaced plates, is a generally U-shaped lug 97, comprising locking lips 98 and 100 which extend toward and are engageable with the arm 82 of the jaw, and which define therebetween opening 102. Spaced outwardly from lug 97 is another lug 104, said lugs defining therebetween a slot 106 in which is received a lock bar 74 hereinafter described. As best seen in Figure 15, the rearward portion of locking lip 100 may be provided with a notch or recess 135 adapted to receive a portion of wall 27a when the lock is in the extreme release position.

In the cavity 110, defined by the plates 92 and 94 and the web 96, is positioned a lock spring 72 having ends 73 and 75. End 73 of the spring abuttably engages web 96 of the lock, and end 75 abuttably engages wall 29 of the plate so as to maintain a continuous pressure on the lock and urge it into a position of engagement with the jaw.

The lock bar 74 is a generally flat strip which may be bent to accommodate its positioning in the assembly. The bar has one end 116 pivotally secured to the underside of the wheel plate at pivot 117, and has in the other end 118 an opening 120 in which is pivotally received the end of lock handle 76, which is hereinafter described. The lock bar is positioned so that the central section thereof rides in slot 106 of the lock between lugs 97 and 104, and abuttably engages the lugs so that when the bar is moved in either direction about pivot 117 the lock will be moved toward or away from the jaw.

The lock bar 74 is operated by means of an operating handle 76, shown in detail in Figures 20–22. The handle may be bent at one end so as to pivotally engage aperture 120 of the lock bar on an axis angularly related to the longitudinal axis of the handle and may be bent at the other end so as to provide a convenient handle. Intermediate the ends of the handle are shoulders 125 and 126. Depending from the outer edge of the plate 26 is a flange 122 having therein a vertical elongated aperture 124, through which is received the handle 76 so that the shoulders 125 and 126 are disposed on the inside of the flange when wheel is locked, as seen in Figure 1. Additionally, a safety latch 78 is pivotally positioned on the outer side of flange 122 adjacent the aperture.

To describe the operation of the mechanism during the coupling operation, starting with the mechanism in uncoupled position (as shown in Figures 7–9), the tractor may be backed into the trailer so that the king pin 20 enters the slot 30 of the plate 26. As the king pin enters the slot, the front portion of the king pin engages the tail 84 of the jaw and forces the jaw to rotate back, or in a counterclockwise direction, about pivot 90. As the jaw rotates, the arm 82 comes forward around the rear portion of the king pin 20, until the pin finally comes to rest in slot 30 of the plate and slot 80 of the jaw.

After the tail passes lip 100 of the lock, forcing it away from the jaw momentarily, the spring forces the entire lock mechanism toward the jaw until the lips 98 and 100 of the lock surround the arm 82 of the jaw which is received in slot 102 between the lips of the lock, and thus the king pin is held firmly in position.

To insure the mechanism remaining in locked, or coupled, position the handle is carried all the way in and dropped so that the shoulder 126 abuts the inside edge of the flange 122, adjacent the aperture 124, then safety latch 78 rotates by gravity from the position shown in Figure 9 to that shown in Figure 6 so as to engage the handle and prevent its upward movement so the shoulder 126 will remain in engagement with the flange 122.

To uncouple the device the lock may be placed in lockset position. The safety latch is pushed aside and the handle lifted to disengage shoulder 126 from the flange 122, then the handle is pulled out; this moves the lock away from the jaw and compresses the spring 72; as the handle is moved out it is lifted so that the shoulder 125 abuts the outer edge of the flange 122, adjacent the aperture 124; the spring 72 is urging the lock and the handle inwardly so the shoulder will stay in place against the flange until the pressure of the spring is released and the handle dropped down. Thus when the tractor is driven out from under the trailer the jaw is free to rotate in a clockwise direction until the king pin is released and withdraws from slot 30 of the plate 26.

When the lock is in lockset position, as shown in Figures 10, 11 and 12, the lock is still in a position of limited overlap with the arm 82 or tail 84 of the jaw 68 so that when the jaw is pulled open by the trailer pin 20 there is a camming action between the ends of the jaw arm and tail, either between tapered end of arm 82 and end of lip 98 or rounded end of tail 84 and lip 100 so that in either case the lock is forced outward a short distance as the jaw opens, this compresses the spring 72 and moves lock bar 74 and handle 76 outward as seen in Figure 7. Tension to hold shoulder 125 in engagement with outer face of flange 122 above hole 124, shown in Figure 11, is thus released and handle 76 is free to drop to bottom of hole 124 to the position as seen in Figure 8. Thus when next coupling is made the lock is free to move inward to locked position upon closing of the jaw as covered under description of coupling action with the parts moving from position shown in Figure 7 to that shown in Figure 4. The manual manipulation or rotation of the jaw 68 can be accomplished by first pulling the handle 76 out beyond the lockset position so that the spring pressure cannot act through the lock on the tail portion 84 of the jaw. With a lock lips free from engagement with the jaw, the jaw may be manually rotated about its pivot 90 to any desired position.

It will be noted that plate 26 is pivotally mounted to the tractor so that it is free to adjust itself with relation to the underside of the tractor.

We claim:

1. In a fifth wheel coupling assembly, a wheel plate defining a pin receiving slot, a pin engaging jaw movably carried by said plate adjacent said slot, said jaw comprising spaced front and rear arms, a lock movably carried by said plate, said lock having at one end thereof protruding lips engageable with the front arm of said jaw and having at the other end thereof a cavity therein, a spring disposed for the major portion of its length within said cavity and compressed between said plate and said lock and maintaining said lock in pressured engagement with said jaw, and an operating bar received within a slot of said lock between the ends of said cavity.

2. A locking arrangement according to claim 1, and including a handle connected to the bar, said handle having oppositely facing shoulders separately abuttably engageable with said plate and operable, respectively to retain said lock in pre-set positions.

3. In a locking arrangement for a fifth wheel assembly, a jaw member having an opening therein and an arm and tail integral therewith defining a space therebetween to receive an element to be coupled to the assembly, a wheel plate, a connection between said jaw member and said plate accommodating movement of the jaw member relative to the plate, walls depending from said plate forming a channel therebetween, a slidable locking member positioned in said channel and including a pair of lips engageable with the arm of said jaw member, a spring disposed for the major portion of its length within the locking member and reacting between one of said walls and said locking member and offering pressure therebetween, a lock bar movably connected to said plate and engaging said locking member between the ends of the spring at one side thereof, a lock handle carried by said plate and having one end connected to said lock bar, said jaw member and handle being free of any direct connection to any spring.

4. In a locking arrangement for a fifth wheel coupling device having a wheel plate defining a pin receiving slot, a movable pin engaging jaw carried by said plate, a movable lock carried by said plate and engageable with said jaw, a flange depending from said plate and defining an opening therein, and a handle operatively connected to said lock and positioned in said opening, and means to retain said jaw and said lock in locked position, said means comprising a shoulder on said handle intermediate the ends thereof abuttably engageable with one side of said flange adjacent said opening, and a latch movably carried by said flange adjacent said opening serving to maintain said shoulder in abutment with said flange.

5. In a locking arrangement for a fifth wheel coupling device having a wheel plate defining a pin receiving slot, a movable pin engaging jaw carried by said plate, a movable spring loaded lock carried by said plate and engageable with said jaw, a flange depending from said plate and defining an opening therein, and a handle having an operative connection to said lock and positioned in said opening, and means to retain said jaw and said lock in lock-set position during the uncoupling operation, said means comprising a shoulder on said handle intermediate the ends thereof releasably held by the lock in engagement with the one side of said flange at the top of said opening, and means on the jaw engageable with the lock to release said shoulder as the jaw opens, said handle being movable downwardly by gravity to the bottom of said opening when the shoulder is so released.

6. In a fifth wheel coupling arrangement for vehicles, a rigid pin member on one vehicle, a movable pin receiving member on the other vehicle, said pin receiving member comprising a fifth wheel plate defining a pin receiving slot, and means to grasp and retain said pin in said slot when the vehicles are moved together, said means comprising a jaw member rotatably carried by said plate adjacent said slot, said jaw member having tail and arm elements defining a pin receiving aperture therebetween, a spring abutting said plate, a lock abutting said spring and engageable with said jaw member, a handle operatively connected to said lock and having retaining lugs thereon, flanges depending from said wheel plate defining a cavity therebetween open on one end, said cavity serving to house said lock, and another flange depending from said plate at the outer edge thereof, said last mentioned flange defining an opening therein through which is carried said handle, said flange serving to abut the lugs on said handle to maintain the lock in pre-set positions.

7. In a locking device for a fifth wheel coupling arrangement, a pin member, a pin receiving member, a movable jaw carried by said pin receiving member, said jaw being capable of clasping said pin member, a movable lock also carried by said pin receiving member, said lock being engageable with said jaw to lock same, a spring carried by said lock in abutment with said pin receiving member, and means to retain said lock and said jaw in locked position, said means comprising a lock handle operatively connected to said lock, a shoulder on said handle, said shoulder being capable of abutting said pin receiving member so as to prevent said lock from slipping out of locked position, and a latch engageable with said handle so as to maintain said shoulder in abutment with said pin receiving member.

8. A locking device according to claim 7, and including another shoulder on said handle abuttably engageable with said pin receiving member so as to maintain said lock in a lock-set position.

9. In a device of the class described, a fifth wheel plate having a slot, jaw means for retaining a king pin in said slot, said jaw means being movable to open and closed positions relative to said slot, movable lock means, spring means for urging said lock means to a locked position thereof whereat said jaw means are locked in closed position thereof, said jaw means in open position thereof holding said lock means in unlocked position against the resistance of said spring means, and said lock means being movable to a lockset position whereat said jaw means are free to move to open position thereof, and operating means connected to the lock means comprising a handle having a shoulder engageable with a surface of the plate to hold the lock means in locked position, said handle having another shoulder above the level of the first mentioned shoulder and engageable in an elevated position of the handle with another surface of the plate to hold the lock means in lockset position, said other shoulder being frictionally engaged with said other surface by the force of said spring means, and means on said jaw means engageable with said lock means to disengage said other shoulder from said other surface as the jaw means move to open position thereof whereby said handle falls from said elevated position thereof to a position whereat the lock means may be urged by said spring means to locked position upon return of said jaw means to closed position thereof.

10. In a locking arrangement for a coupling device having a wheel plate defining a king pin receiving an opening therein, a movable jaw member connected to the plate and disposed adjacent said opening, a lock member movably carried by the plate and operable to engage said jaw member and retain it in locked position, a spring disposed substantially within said lock member and compressed between said lock member and said plate, an operating handle associated with said lock member, and a flange depending from said plate adjacent the outer periphery thereof and presenting outer and inner surfaces and having an aperture extending therethrough between said surfaces, said handle being disposed to extend through said aperture and presenting stop means thereon engageable with the surfaces of said flange adjacent said aperture, said stop means being operable to maintain said lock member in pre-set positions relative to said jaw member.

11. In a locking arrangement for a coupling device having a wheel plate defining a king pin receiving opening therein, a movable jaw member connected to the plate and disposed adjacent said opening, a lock member movably carried by the plate, said lock member presenting substantially U-shaped openings at opposite ends thereof, one of said openings being operable to engage said jaw member and retain it in locked position, a spring disposed substantially within the other of said openings and compressed between said lock member and said plate, and an operating handle associated with said lock member.

12. In a device of the class described, a fifth wheel plate having a slot to receive a pin, movable jaw means to retain the pin in said slot, lock means engageable with the jaw means to lock the pin in closed position, spring means for urging said lock means to locked position, and a handle operatively connected to said lock means and movable axially to move said lock means into and out of engagement with said jaw means, said handle having oppositely facing shoulders presenting spaced parallel surfaces engageable with oppositely facing spaced parallel surfaces of said plate to retain the lock in locked and lockset positions, respectively.

13. In a device of the class described, a fifth wheel plate having a pin receiving slot, jaw means movable to a closed position to retain a pin in said slot and movable to an open position, lock means engageable with the jaw means to lock said jaw means in closed position, a recess in the bottom of said lock means, an operating bar received in said recess, and a lock cover removably mounted on said plate, said bar and lock slidably supported by said cover.

14. In a device of the class described, a fifth wheel plate having a pin receiving slot, jaw means rotatably mounted on the bottom of said plate to retain a pin in said slot, said jaw means having an arm and a tail, a lock having spaced elements defining an opening receiving said arm when the jaw is in closed position, and spaced abutments on the bottom of said plate confining said elements, one of said elements being engageable with one of said abutments to positively limit rotation of the jaw in one direction, and the other of said elements being engageable with the other of said abutments to positively limit rotation of the jaw in the opposite direction.

15. In a device of the class described, a fifth wheel plate having a pin receiving aperture, jaw means pivoted to the bottom of the plate, said jaw means in open position accommodating entry of a pin into said aperture and removal of said pin therefrom, said jaw in closed position retaining said pin in said aperture, a lock movable to locked and unlocked positions, said lock in locked position receiving a portion of said pin means within an opening of said lock to prevent rotation of the jaw means in either direction from closed position thereof, an abutment on the bottom of said plate abutting one side of the lock, and spaced abutments depending from the bottom of said plate facing the first mentioned abutment, one of said spaced abutments being spaced further than the other of said spaced abutments from the first mentioned abutment, said lock having a wide portion defining said opening and engaging said one spaced abutment at the opposite side of said lock, and having a relatively narrow portion engaging the other spaced abutment at said opposite side of said lock, and a recess in said wide portion receiving a portion of said other abutment when the lock is in unlocked position, said abutments guiding the lock in its movement to and from locked positions and restraining rotation of the jaw means and lock when the latter is in locked position.

16. In a device of the class described, a fifth wheel plate having a pin receiving slot, jaw means to confine a pin in said slot, lock means for said jaw means, spring means urging said lock means into locking engagement with said jaws means in closed position thereof, a handle having a connection to said lock means for urging the latter to a lockset position, said handle and plate having lockset means held in engagement by said spring means when the lock means are in lockset position, said connection having gravity actuated means urging downward movement of the handle to release said lockset means upon compression of said spring means, and means on the jaw means to engage the lock means and thereby compress the spring means as said jaw means move to open position.

17. In a device of the class described, a fifth wheel plate having a pin receiving slot, movable jaw means to confine a pin in the slot, lock means movably mounted on the plate for movement to unlocked position and to locked position whereat the jaw is locked in its closed position, a handle having an operative connection to said lock and movable axially to move the lock to unlocked position, and stop means on the handle engageable with the stop means on said plate for holding the handle in a position whereat the lock is in unlocked position, each of said stop means comprising pairs of oppositely facing stop surfaces on the handle and plate, respectively, all of said surfaces lying in planes which intersect the longitudinal axis of the handle.

18. In a fifth wheel coupling assembly, a wheel plate defining a pin receiving slot, a pin engaging jaw movably carried by the plate adjacent said slot, a lock movably carried by the plate and engageable with the jaw, a spring compressed between said plate and said lock, a handle operatively connected to the lock for moving it to unlocked position, means on said handle engageable with said plate to afford a lockset when the lock is in unlocked position, and stop means on the plate engageable with the lock when the latter is in unlocked position to thereby limit compression of the spring and indicate to an operator that the lock is in said unlocked position.

19. In a device of the class described, a fifth wheel plate having a pin receiving slot, a jaw movably carried by the plate to retain a pin in said slot, said jaw having spaced elements defining a slot therebetween, a lock movably carried by said plate to retain said jaw in a closed position, said lock having spaced elements defining a slot therebetween, and spring means reacting between the plate and the lock to maintain said lock in snug pressured engagement with said jaw whereby one of said lock elements is held in said jaw slot and one of said jaw elements is held in said lock slot to provide a double interlocking relationship between said lock and said jaw when said device is in locked position.

20. A device according to claim 14, wherein one of said elements is provided with a recess for receiving a portion of one of said abutments when the lock is in release position.

References Cited in the file of this patent

UNITED STATES PATENTS

| | | |
|---|---|---|
| 1,592,832 | La Londe | July 20, 1926 |
| 1,929,220 | Steinhauer | Oct. 3, 1933 |
| 1,981,233 | Harris | Nov. 20, 1934 |
| 2,031,256 | Dorsey | Feb. 18, 1936 |
| 2,075,781 | Lechtenberg | Mar. 30, 1937 |
| 2,144,243 | Fraser | Jan. 17, 1939 |
| 2,610,069 | Ketel | Sept. 9, 1952 |

FOREIGN PATENTS

| | | |
|---|---|---|
| 1,022,694 | France | Dec. 17, 1952 |
| 379,301 | Great Britain | Aug. 22, 1932 |